US012724150B2

(12) United States Patent
Inoue et al.

(10) Patent No.: US 12,724,150 B2
(45) Date of Patent: Sep. 1, 2026

(54) OPTICAL RANGEFINDER AND OPTICAL RANGEFINDING METHOD

(71) Applicant: HOKUYO AUTOMATIC CO., LTD., Osaka (JP)

(72) Inventors: Keisuke Inoue, Osaka (JP); Kentaro Nishimura, Osaka (JP)

(73) Assignee: HOKUYO AUTOMATIC CO., LTD., Osaka (JP)

( * ) Notice: Subject to any disclaimer, the term of this patent is extended or adjusted under 35 U.S.C. 154(b) by 677 days.

(21) Appl. No.: 18/038,293

(22) PCT Filed: Aug. 18, 2021

(86) PCT No.: PCT/JP2021/030136

§ 371 (c)(1), (2) Date: May 23, 2023

(87) PCT Pub. No.: WO2022/113438

PCT Pub. Date: Jun. 2, 2022

(65) Prior Publication Data

US 2024/0004070 A1 Jan. 4, 2024

(30) Foreign Application Priority Data

Nov. 30, 2020 (JP) ................................. 2020-198037

(51) Int. Cl.
*G01S 17/14* (2020.01)
*G01S 7/4865* (2020.01)

(52) U.S. Cl.
CPC ............ *G01S 17/14* (2020.01); *G01S 7/4865* (2013.01)

(58) Field of Classification Search
CPC ............................... G01S 17/14; G01S 7/4865
See application file for complete search history.

(56) References Cited

U.S. PATENT DOCUMENTS 4,251,733 A * 2/1981 Hirleman, Jr. ..... G01N 15/0205 250/575
2014/0024020 A1* 1/2014 Tanabe .................. G02B 21/16 435/5

(Continued)

FOREIGN PATENT DOCUMENTS

CN 111936885 A 11/2020
CN 112255635 A 1/2021

(Continued)

OTHER PUBLICATIONS

Mar. 27, 2025 Office Action issued in Taiwanese Patent Application No. 110143039.

(Continued)

*Primary Examiner* — Jonathan Malikasim
(74) *Attorney, Agent, or Firm* — Oliff PLC

(57) ABSTRACT

A TOF optical rangefinder 200 calculates a distance to an object based on the time of flight measured based on a sum of voltage pulses output from a plurality of photon-counting light receiving elements 3, where the optical rangefinder 200 is configured to generate a histogram showing a distribution frequency of the times of flight, as calculated by a time-of-flight measurement circuit for repeated emission of measurement light at predetermined periods, over respective regions on a time axis divided into a plurality of regions at predetermined time intervals, calculate a representative value of the times of flight for the object from the times of flight distributed over the regions where the histogram frequency reaches a predetermined histogram threshold, and correct the representative value of the times of flight based on a frequency-error characteristic obtained by a histogram generation circuit with intensity of the reflected light varied in advance.

12 Claims, 9 Drawing Sheets

(56) References Cited

U.S. PATENT DOCUMENTS

| | | | | |
|---|---|---|---|---|
| 2014/0103196 | A1* | 4/2014 | Soga | H10F 30/225 250/206 |
| 2014/0368613 | A1* | 12/2014 | Krupka | G01S 7/497 348/46 |
| 2020/0132817 | A1* | 4/2020 | Ueno | G01S 17/14 |
| 2021/0018624 | A1* | 1/2021 | Tachino | G01S 17/10 |
| 2021/0373156 | A1 | 12/2021 | Kimura et al. | |

FOREIGN PATENT DOCUMENTS

| | | | |
|---|---|---|---|
| JP | H04-339289 | A | 11/1992 |
| JP | H07-128438 | A | 5/1995 |
| JP | H09-318734 | A | 12/1997 |
| JP | 2010-256205 | A | 11/2010 |
| JP | 2011-027451 | A | 2/2011 |
| JP | 2014-081253 | A | 5/2014 |
| JP | 2014-081254 | A | 5/2014 |
| JP | 2018-017534 | A | 2/2018 |
| JP | 2018-091760 | A | 6/2018 |
| WO | 2020/166609 | A1 | 8/2020 |

OTHER PUBLICATIONS

Nov. 2, 2021 International Search Report issued in International Patent Application No. PCT/JP2021/030136.

May 30, 2023 International Preliminary Report on Patentability issued in International Patent Application No. PCT/JP2021/030136.

* cited by examiner

OPTICAL RANGEFINDER AND OPTICAL RANGEFINDING METHOD

TECHNICAL FIELD

The present invention relates to an optical rangefinder including photon-counting light receiving elements and an optical rangefinding method.

BACKGROUND ART

Patent Literature 1 discloses an optical rangefinder for measuring a distance based on difference between an emission time of irradiation light and a reception time of reflected light, the optical rangefinder including: a light source that emits pulsed light; a measurement light receiving unit with variable sensitivity including a photon-counting measurement light receiving element that receives light from an object; a scanning unit that scans in light emitting and light receiving directions; a reference light receiving unit including a reference light receiving element that receives light, other than projected light, from a region that the measurement light receiving unit measures next time using the scanning unit; and a control unit that controls the sensitivity of the measurement light receiving unit according to the light amount received by the reference light receiving unit.

Patent Literature 2 discloses an optical measurement device including: a light source that emits laser light; a light receiver including a plurality of photon-counting light receiving elements; a histogram generator that generates a histogram showing relationship between an integrated value, which is obtained by integrating a response frequency of each of the plurality of light receiving elements for each successive predetermined time interval, and an elapsed time, during a period including a period in which the laser light is not emitted by the light source and a period in which the laser light is emitted; a light amount estimator that estimates, as a background light amount, a light amount received by the light receiver when the laser light is not emitted based on a response frequency in the histogram corresponding to when the laser light is not emitted, and estimates a reflected light amount of the laser light from an object received by the light receiver by subtracting the background light amount from a received light amount estimated based on a response frequency in the histogram corresponding to when the laser light is emitted; and a distance estimator that derives, when an output signal is unstable due to characteristics in at least part of the light receiving elements and the histogram generator, a provisional distance to the object based on the time corresponding to a peak of the reflected light amount estimated by the light amount estimator in the histogram, derives an amount of offset due to the unstable output signal and corresponding to the background light amount and the reflected light amount estimated by the light amount estimator, and estimates a distance to the object based on the provisional distance and the offset amount.

CITATION LIST

Patent Literature

Patent Literature 1: Japanese Unexamined Patent Application Publication No. 2014-081254

Patent Literature 2: Japanese Unexamined Patent Application Publication No. 2018-091760

SUMMARY OF INVENTION

Technical Problem

The optical rangefinder disclosed in Patent Literature 1 aims to appropriately expand a dynamic range of brightness of a photodetector. However, it requires, in addition to the photon-counting measurement light receiving element, the photon-counting reference light receiving element as a reference light receiving unit. This leads to an increase in the number of parts and an increase in circuit scale, which will increase costs and limit the circuit miniaturization.

The optical measurement device disclosed in Patent Literature 2 needs to determine the background light amount and, as the peak value of the reflected light amount itself varies depending on the magnitude of the light reception signal, further correction will be necessary to accurately determine the distance.

It is an object of the present invention to provide an optical rangefinder and an optical rangefinding method that can appropriately correct a calculated distance without needing to determine the background light amount, while avoiding an increase in circuit scale despite the use of photon-counting light receiving elements.

Solution to Problem

To achieve the above object, an optical rangefinder is provided in accordance with the present invention. As a first feature of the optical rangefinder in accordance with the present invention, the optical rangefinder includes: a light emitting element configured to emit pulsed measurement light; a plurality of photon-counting light receiving elements configured to detect reflected light from an object for the measurement light; an adder circuit configured to add a voltage pulse output from each of the light receiving elements; a time-of-flight measurement circuit configured to calculate, as a time of flight, time from an emission time point of the measurement light to a time point when a sum of the adder circuit reaches a predetermined addition threshold; a histogram generation circuit configured to generate a histogram showing a frequency distribution of the times of flight, as calculated by the time-of-flight measurement circuit for repeated emission of the measurement light at predetermined periods, over respective regions on a time axis divided into a plurality of regions at predetermined time intervals; a representative value calculation circuit configured to calculate a representative value of the times of flight for the object from the times of flight that are distributed over the regions where the frequency reaches a predetermined histogram threshold based on the histogram; and a distance calculation circuit configured to calculate a distance to the object based on the representative value of the times of flight calculated by the representative value calculation circuit. The distance calculation circuit includes an error correction circuit configured to calculate an error correction value based on a frequency-error characteristic and correct the distance or the representative value of the times of flight with the error correction value, the frequency-error characteristic being determined by an error, the error being obtained from the frequency, as obtained by the histogram generation circuit with intensity of the reflected light varied in advance, and difference between an actual distance and the distance or difference between an actual time of flight and the representative value of the times of flight.

Reflected light for the pulsed measurement light emitted from the light emitting element toward an object is detected by the plurality of photon-counting light receiving elements, and a voltage pulse output from each of the light receiving elements is added by the adder circuit. A time of flight from an emission time point of the measurement light to a time point when a sum calculated by the adder circuit reaches a predetermined addition threshold is calculated by the time-of-flight measurement circuit. A histogram showing a frequency distribution of the times of flight over respective regions on a time axis divided into a plurality of regions at predetermined time intervals is generated by the histogram generation circuit, based on the times of flight calculated by the time-of-flight measurement circuit for repeated emission of the measurement light at predetermined periods. A representative value of the times of flight for the object is calculated by the representative value calculation circuit from the times of flight distributed over the regions where the frequency reaches a predetermined histogram threshold, and a distance to the object is calculated by the distance calculation circuit based on the representative value of the times of flight. The error correction circuit included in the distance calculation circuit corrects the distance or the representative value of the times of flight with an error correction value. The error correction circuit calculates the error correction value based on a frequency-error characteristic and corrects the distance or the representative value of the times of flight with the error correction value, where the frequency-error characteristic is determined by an error, the error being obtained from the frequency, as obtained by the histogram generation circuit with intensity of the reflected light varied in advance, and difference between an actual distance and the distance or difference between an actual time of flight and the representative value of the times of flight. With this feature, any calculated distance can be appropriately corrected without needing to determine a background light amount, while avoiding an increase in circuit scale despite the use of photon-counting light receiving elements.

In addition to the first feature above, the optical rangefinder in accordance with the present invention has a second feature that the frequency-error characteristic is specified based on an intensity-frequency characteristic and an intensity-error characteristic for the measurement light repeatedly emitted at predetermined periods in advance, the intensity-frequency characteristic exhibiting correlation between an index of the intensity of the reflected light and the frequency obtained by the histogram generation circuit, the intensity-error characteristic exhibiting correlation between the index of the intensity of the reflected light and the error.

For the measurement light repeatedly emitted at predetermined periods and under different intensities of the reflected light, the intensity-frequency characteristic exhibiting correlation between the index of the reflected light intensity and the frequency obtained by the histogram generation circuit and the intensity-error characteristic exhibiting correlation between the index of the reflected light intensity detected by the light receiving elements and the error are determined, and both characteristics are combined based on the reflected light intensity to obtain the frequency-error characteristic.

In addition to the second feature above, the optical rangefinder in accordance with the present invention has a third feature that the frequency-error characteristic exhibits a monotonically decreasing characteristic in which the error decreases with an increase in the frequency.

The intensity-frequency characteristic exhibits a monotonically increasing characteristic in which the frequency increases as the reflected light intensity increases to a certain value. The intensity-error characteristic exhibits a monotonically decreasing characteristic in which the delay time decreases as the reflected light intensity increases. Combining both characteristics based on the reflected light intensity yields a monotonically decreasing characteristic in which the error decreases as the frequency increases.

In addition to any of the first to third features above, the optical rangefinder in accordance with the present invention has a fourth feature that the error correction circuit is configured to calculate the error correction value based on a duration-error characteristic and correct the distance or the representative value of the times of flight with the error correction value after the frequency of the frequency-error characteristic is saturated, the duration being a period of time in which the sum of the adder circuit is equal to or greater than the addition threshold with the intensity of the reflected light varied in advance.

The frequency of the frequency-error characteristic is saturated once it exceeds a certain value, which renders the error characteristic unknown after the saturation, making appropriate correction difficult. In such cases, based on the duration, which is a period of time in which the sum of the adder circuit is continuously equal to or greater than the predetermined addition threshold, the duration-error characteristic can be utilized for appropriate correction.

In addition to the fourth feature above, the optical rangefinder in accordance with the present invention has a fifth feature that the duration-error characteristic is a characteristic specified based on the intensity-error characteristic and an intensity-duration characteristic for the measurement light repeatedly emitted at predetermined periods in advance, the intensity-error characteristic exhibiting correlation between the index of the intensity of the reflected light and the error, the intensity-duration characteristic exhibiting correlation between the index of the intensity of the reflected light and the duration in which the sum of the adder circuit is equal to or greater than the addition threshold.

The duration-error characteristic is obtained by determining, for the measurement light repeatedly emitted at predetermined periods and under different intensities of the reflected light, the intensity-error characteristic exhibiting correlation between the reflected light intensity and the error and the intensity-duration characteristic exhibiting correlation between the reflected light intensity and the duration in which the sum of the adder circuit is equal to or greater than the predetermined addition threshold, and then combining both characteristics based on the reflected light intensity.

In addition to the fifth feature above, the optical rangefinder in accordance with the present invention has a sixth feature that the duration is a sum of the durations obtained by the histogram generation circuit for the regions where the predetermined histogram threshold is reached divided by a sum of respective frequencies for the regions.

The duration in the intensity-duration characteristic can be smoothed by dividing the sum of the durations obtained by the histogram generation circuit for the regions where the predetermined histogram threshold is reached by the sum of respective frequencies for these regions. The duration as used herein can be a mean value of the histogram distribution.

In addition to any of the fourth to sixth features above, the optical rangefinder in accordance with the present invention has a seventh feature that duration-error characteristic exhibits a monotonically increasing characteristic in which the error increases with an increase in the duration.

The intensity-error characteristic exhibits a monotonically decreasing characteristic in which the error decreases as the reflected light intensity increases. The intensity-duration characteristic exhibits a characteristic in which the duration gradually increases in the regions with low to medium reflected light intensities and gradually decreases in the regions with medium to high reflected light intensities, with the maximum duration occurring in the region with the medium reflected light intensity. Combining both characteristics based on the reflected light intensity yields a monotonically decreasing characteristic in which the error decreases with an increase in the duration in the regions with low to medium reflected light intensities, and yields a monotonically decreasing characteristic in which the delay time decreases with a decrease increase in the duration, or, in other words, a monotonically increasing characteristic in which the error increases with an increase in the duration, in the regions with medium to high reflected light intensities. Since the received light intensity at which the duration is longest corresponds to the received light intensity at which the histogram frequency is saturated, upon the frequency being saturated in the frequency-error characteristic, the correction can then be made based on the duration-error characteristic.

In addition to any of the first to seventh features above, the optical rangefinder in accordance with the present invention has an eighth feature that the representative value calculation circuit is configured to calculate, as the representative value of the times of flight for the object, a value that is a total sum of the times of flight distributed over the regions where the frequency reaches the histogram threshold based on the histogram divided by a sum of respective frequencies for the regions.

As an algorithm to absorb any error, it is preferable to use the representative value of the times of flight for the object that is a total sum of the times of flight distributed over the regions where the frequency reaches the predetermined histogram threshold divided by a sum of respective frequencies for the corresponding regions.

In addition to any of the first to seventh features above, the optical rangefinder in accordance with the present invention has a ninth feature that the representative value calculation circuit is configured to calculate, as the representative value of the times of flight for the object, a value that is a total sum of times of flight distributed over regions where the frequency reaches the histogram threshold and a region adjacent thereto based on the histogram divided by a sum of respective frequencies for corresponding regions.

It is contemplated that the histogram frequencies may exist across the respective regions on the time axis divided into the multiple regions. Even in such cases, however, a more accurate representative value can be obtained by calculating, as the representative value of the times of flight for the object, a total sum of the times of flight distributed over the regions where the frequency reaches the predetermined histogram threshold and any region adjacent thereto based on the histogram divided by a sum of respective frequencies for the corresponding regions. This can reduce the effect of chattering, in which the frequencies are distributed over adjacent bins in the histogram.

In addition to any of the first to seventh features above, the optical rangefinder in accordance with the present invention has a tenth feature that the representative value calculation circuit is configured to calculate, as the representative value of the times of flight for the object, a value that is a total sum of the times of flight distributed over a plurality of adjacent regions divided by a sum of respective frequencies for corresponding regions, the plurality of adjacent regions being regions where a total sum of the frequencies distributed over the plurality of adjacent regions reaches the histogram threshold based on the histogram.

When a frequency in a single region does not reach the predetermined histogram threshold but a total sum of frequencies distributed over multiple regions reaches the histogram threshold, a more accurate representative value can be obtained by calculating, as the representative value of the times of flight, a total sum of the times of flight distributed over the multiple regions divided by a sum of respective frequencies for the corresponding regions. This can reduce the effect of chattering, in which the frequencies are distributed over adjacent bins in the histogram.

In addition to any of the first to seventh features above, the optical rangefinder in accordance with the present invention has an eleventh feature that the time-of-flight measurement circuit is configured to calculate, as the time of flight, a time of flight from the emission time point of the measurement light to each of time points when an output value of the adder circuit reaches a first addition threshold and reaches a second addition threshold higher than the first addition threshold, the histogram generation circuit is configured to generate a histogram showing a frequency distribution of the times of flight, as calculated by the time-of-flight measurement circuit for repeated emission of the measurement light at predetermined periods, over respective regions on a time axis divided into a plurality of regions at predetermined time intervals, the representative value calculation circuit is configured to calculate, as the representative value of the times of flight for the object, a total sum of the times of flight corresponding to the first addition threshold, among the times of flight distributed over the regions where the frequency reaches the histogram threshold based on the histogram based on the first addition threshold, divided by the frequency corresponding to the first addition threshold, and the error correction circuit is configured to calculate the error correction value based on a frequency-error characteristic and correct the distance or the representative value of the times of flight with the error correction value, the frequency-error characteristic being determined by an error, the error being obtained from the frequency, as obtained in the histogram based on the first addition threshold and the second addition threshold, and difference between an actual distance and the distance.

As the time-of-flight measurement circuit is configured to calculate the time of flight until each time point when the first addition threshold is reached and the second addition threshold higher than the predetermined first addition threshold is reached, the histogram frequency increases in the case of using the higher addition threshold for correction. This is equivalent to increasing the dynamic range of the histogram, yielding a more appropriate representative value of the times of flight.

In addition to any of the first to an eleventh features above, the optical rangefinder in accordance with the present invention has a twelfth feature that the optical rangefinder further includes an optical deflection device configured to deflect the measurement light emitted from the light emitting element in a predetermined direction and/or an optical scanning device configured to scan with the measurement light in a predetermined direction.

The measurement light can be deflected toward a space in which objects need to be detected or such a space can be scanned with the measurement light.

An optical rangefinding method is provided in accordance with the present invention. As a first feature of the optical rangefinding method in accordance with the present invention, the method includes: a reflected light detection step of detecting, using a plurality of photon-counting light receiving elements, reflected light from an object for pulsed measurement light emitted from a light emitting element; a time of flight measurement step of calculating, as a time of flight, time between an emission time point of the measurement light and a time point when a sum of voltage pulses output from each of the light receiving elements reaches a predetermined addition threshold; a histogram generation step of generating a histogram showing a frequency distribution of the times of flight, as calculated in the time of flight calculation step for repeated emission of measurement light at predetermined periods, over respective regions on a time axis divided into a plurality of regions at predetermined time intervals; a representative value calculation step of calculating a representative value of the times of flight for the object from the times of flight that are distributed over the regions where the frequency reaches a predetermined histogram threshold based on the histogram; and a distance calculation step of calculating a distance to the object based on the representative value of the times of flight calculated in the representative value calculation step, wherein the distance calculation step includes an error correction step of calculating an error correction value based on a frequency-error characteristic and correcting the distance or the representative value of the times of flight with the error correction value, the frequency-error characteristic being determined by an error, the error being obtained from the frequency, as obtained in the histogram generation step with intensity of the reflected light varied in advance, and difference between an actual distance and the distance or difference between an actual time of flight and the representative value of the times of flight.

In addition to the first feature above, the optical rangefinding method in accordance with the present invention has a second feature that the error correction step calculates the error correction value based on a duration-error characteristic and corrects the distance or the representative value of the times of flight with the error correction value after the frequency of the frequency-error characteristic is saturated, the duration being a period of time in which the sum is equal to or greater than the predetermined addition threshold with intensity of the reflected light varied in advance.

Advantageous Effects of Invention

As described above, the present invention can provide an optical rangefinder and an optical rangefinding method that can appropriately correct a calculated distance without needing to determine the background light amount, while avoiding an increase in circuit scale despite the use of photon-counting light receiving elements.

BEST MODE FOR CARRYING OUT THE INVENTION

An optical rangefinder and an optical rangefinding method in accordance with the present invention will be described below.

Figure 1:
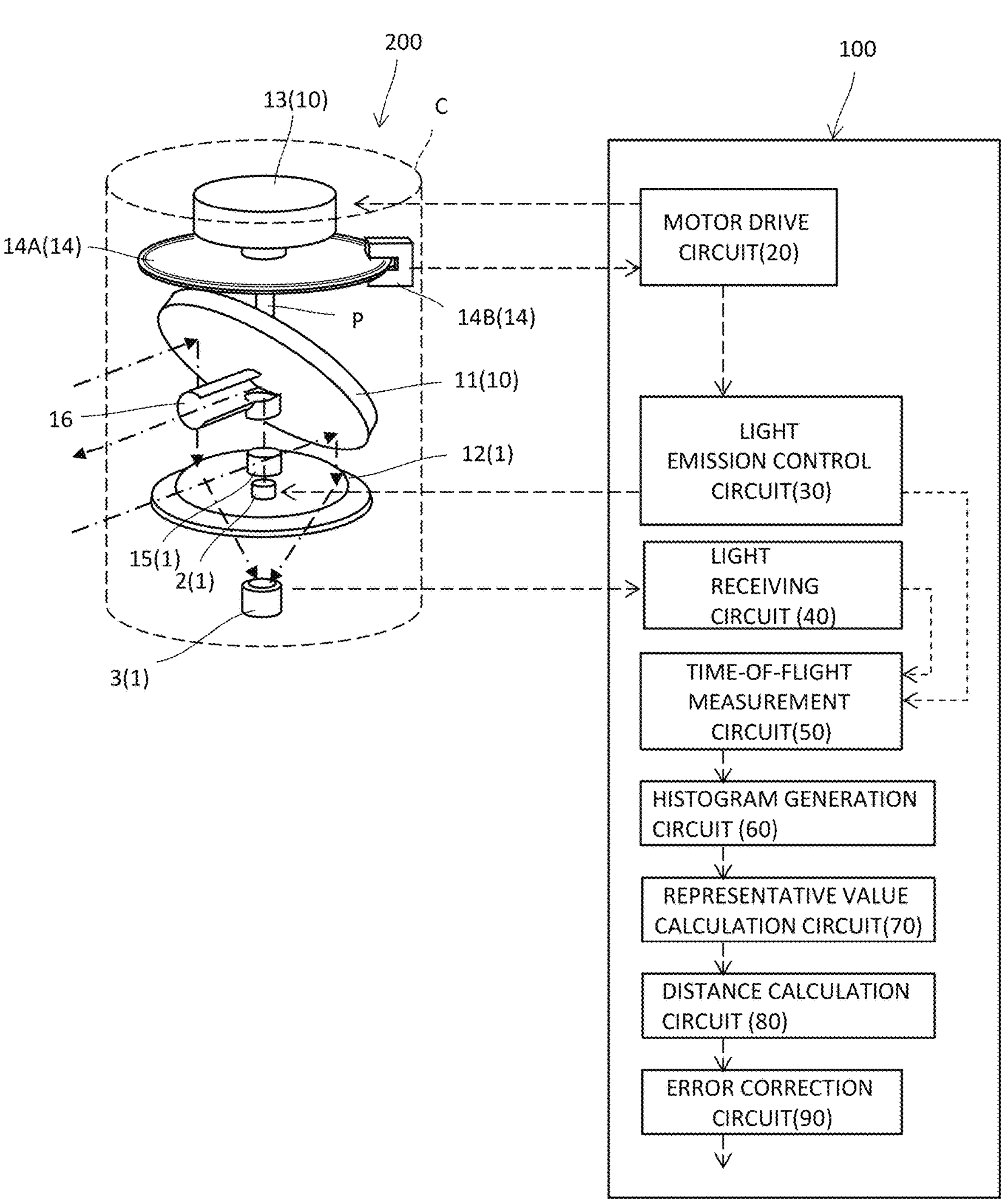
FIG. 1 illustrates a configuration of an optical rangefinder in accordance with the present invention.

As shown in FIG. 1, the optical rangefinder 200 is a TOF optical rangefinder including: a light emitting element 2, housed in a casing C with a light transmissive window, to emit pulsed measurement light; a plurality of photon-counting light receiving elements 3 to detect reflected light from an object for the measurement light; an optical scanning device 10 to scan a measurement space with the measurement light emitted from the light emitting element 2 and guide reflected light diffusely reflected from a surface of the object present in the measurement space to the light receiving elements 3; and a control circuit 100 to drive the light emitting element 2 while actuating the optical scanning device 10 and process signals for the reflected light detected by the light receiving elements 3 to calculate a distance to the object.

The optical scanning device 10 includes: a deflection mirror 11 to deflect the measurement light emitted from the light emitting element 2 toward the measurement space and guide the reflected light from the object to the light receiving elements 3; a motor 13 to rotate the deflection mirror 11 about an axle P; and an encoder 14 to detect a rotational speed and a rotational position of the motor 13.

The encoder 14 is configured with a disc 14A that has slits at predetermined intervals on its outer periphery and rotates about the axle P and a transmissive photointerrupter 14B to detect light passing through the slits formed in the disc 14A.

The deflection mirror 11 is fixed at a 45 degree orientation relative to the axle P, and the light receiving elements 3, a collecting lens 12, the light emitting element 2, and a projection lens 15 are arranged on the axis of the axle P. The pulsed measurement light emitted from the light emitting element 2 is shaped into parallel light as it passes through the projection lens 15, and then propagates along a light guide 16. The measurement light is then deflected at right angles by the deflection mirror 11 and emitted to the monitored area while being deflected for scanning along with rotation of the deflection mirror 11.

The reflected light from the object propagates through the space around the light guide 16 and impinges on the deflection mirror 11, where the reflected light is deflected in the axial direction of the axle P. The reflected light then passes through the collecting lens 12 to enter the light receiving elements 3. The optical scanning device 10 described above is provided by way of example only and not limited to such a configuration as long as it is capable of scanning with, or deflecting, the measurement light emitted from the light emitting element 2 in predetermined directions and guiding the resultant reflected light to the light receiving elements 3. For example, other possible configurations that may be employed include a configuration in which the optical scanning device includes a polygon mirror that rotates at a constant speed or a deflection mirror that oscillates with a driving force from a piezoelectric element or other elements, a configuration in which the entire optical system is rotated, and a configuration in which the entire optical system including the light emitting element 2 and the light receiving elements 3 are rotated.

A laser diode that emits laser light in the near infrared range is used as the light emitting element 2, and a silicon photomultiplier (SiPM), which consists of a matrix arrangement of a plurality of single photon avalanche diodes (SPADs), is used as the light emitting element 3.

When a photon is incident on an avalanche photodiode (APD), pairs of electrons and holes are generated, and the electrons and the holes are each accelerated in a high electric field, sequentially causing collisional ionization of the electrons and the holes, in a manner similar to an avalanche, which generates new pairs of electrons and holes.

Operation modes of the avalanche photodiode (APD) include a linear mode and a Geiger mode. In the linear mode, the APD is operated with a reverse bias voltage below a breakdown voltage, while in the Geiger mode, the APD is operated with the reverse bias voltage equal to or greater than the breakdown voltage. In the linear mode, the multiplication factor can be variably controlled by applying and controlling the reverse bias voltage below the breakdown voltage. An output current is approximately proportional to the amount of incident light, and the multiplication factor, i.e., the sensitivity can be varied by the reverse bias voltage value, so that the output current is used to measure the amount of incident light. In the Geiger mode, incidence of even a single photon can bring about an avalanche phenomenon by application of a reverse bias voltage equal to or greater than the breakdown voltage. Thus, the APD is also called a single-photon avalanche diode (SPAD).

In the case of using a photon-counting light receiving element that outputs a voltage pulse in response to photon incidence, like a single-photon avalanche diode (SPAD), any effect of disturbance light can be eliminated by repeatedly measuring arrival times of the voltage pulse to create a histogram and extract maximum values thereof.

The single-photon avalanche diode (SPAD) can stop the avalanche phenomenon by decreasing the applied voltage to the breakdown voltage. Decreasing the applied voltage to stop the avalanche phenomenon is referred to as quenching. A simplest quenching circuit is implemented by connecting the avalanche photodiode (APD) in series with a quenching resistor. In response to an avalanche current occurring, the voltage between terminals of the quenching resistor increases, causing the bias voltage of the avalanche photodiode (APD) to decrease. Once the bias voltage falls below the breakdown voltage, the avalanche current is stopped. Thereafter, in response to the applied voltage of the single-photon avalanche diode (SPAD) exceeding the breakdown voltage again, the SPAD becomes ready to detect light, but until then, a dead period is present during which the SPAD is not responsive.

Figure 3:
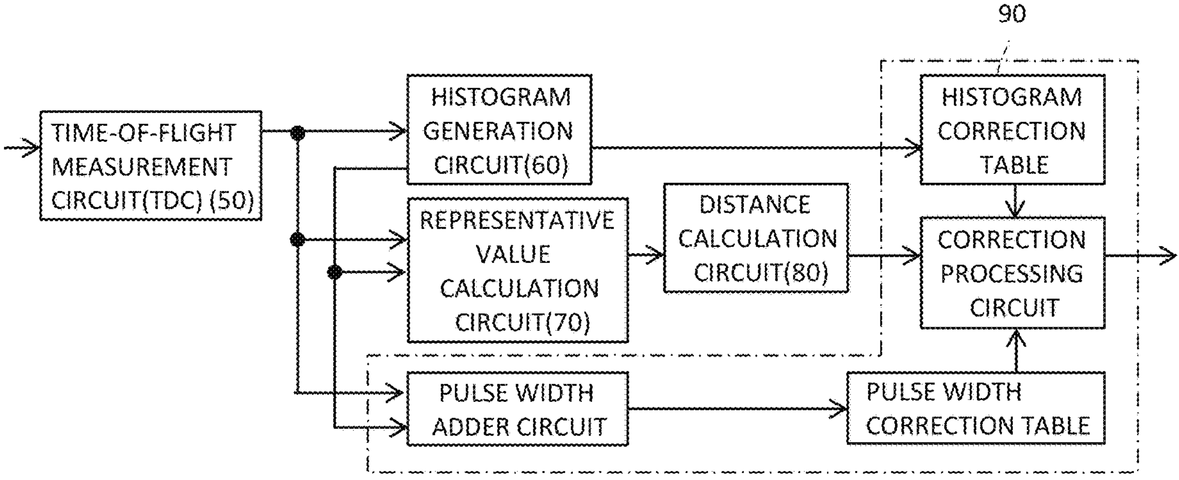
FIG. 3 illustrates major circuits.

The control circuit 100 includes a motor drive circuit 20, a light emission control circuit 30, a light receiving circuit 40, a time-of-flight measurement circuit 50, a histogram generation circuit 60, a representative value calculation circuit 70, a distance calculation circuit 80, and an error correction circuit 90. The error correction circuit 90 is preferably configured to be integral with the distance calculation circuit 80. However, in the present embodiment, the functions of the error correction circuit 90 may be separated from the distance calculation circuit 80, as shown in FIGS. 1 and 3.

The motor drive circuit 20 drives the motor 13 such that the deflection mirror 11 rotates at a predetermined speed based on pulse signals output from the encoder 14. A brushless DC motor and a stepping motor are suitably used as the motor 13.

The light emission control circuit 30 controls the light emitting element 2 such that it emits pulsed measurement light at predetermined periods based on pulse signals output from the encoder 14. For example, when the rotation speed of the deflection mirror 11 (the motor 13) is set to 1200 rpm (50 msec. per rotation) and the resolution of scanning angles of the measurement light, or a unit scanning angle, is set to 0.25°, emitting the pulsed measurement light at 28.8 kHz allows the measurement light to be emitted in units of 0.25°. The above numerical values are provided by way of example only, and the present invention is not limited to these numerical values. The same is true for other example numerical values given below.

In practice, as described below, pulse light with a pulse width of 1 nsec. is emitted 16 times at intervals of about 2 μsec. during the unit scanning angle of 0.25°. Based on the output from each light receiving element 3 that detected the reflected light for each pulse light, the time-of-flight measurement circuit 50 calculates a time of flight, i.e., time elapsed from the emission timing of the measurement light to the reception thereof via reflection from an object, and the histogram generation circuit 60 generates a histogram.

Figure 2:
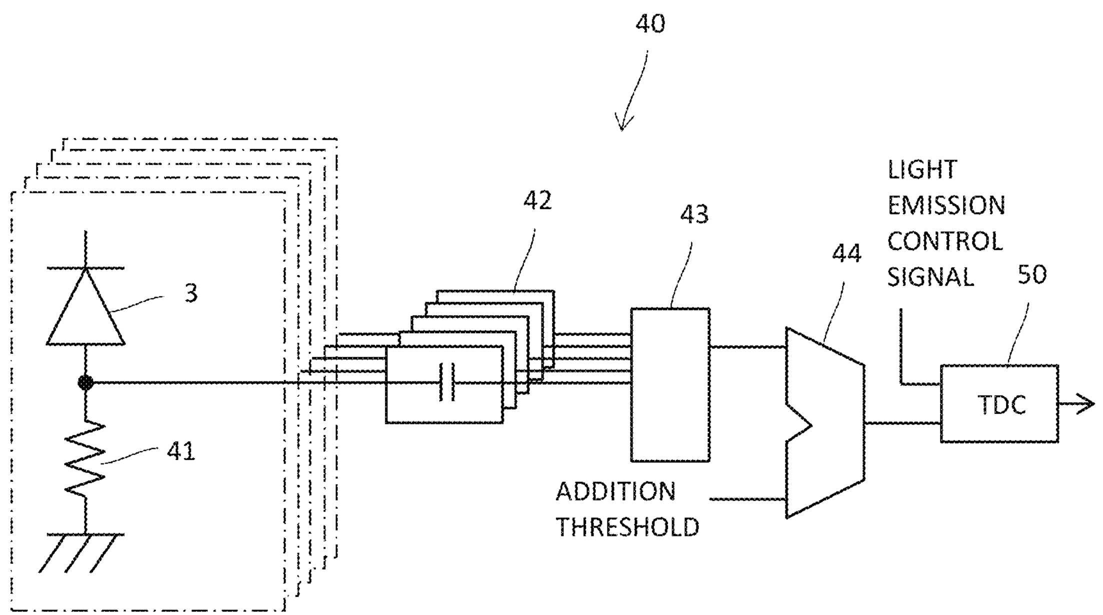
FIG. 2 illustrates a light receiving circuit.

As shown in FIGS. 1 and 2, the light receiving circuit 40 includes: quenching resistors 41 that convert a current pulse output from each light receiving element (single-photon avalanche diode (SPAD)) 3 into a voltage; pulse shaping circuits 42 that are differential circuits including a capacitor to shape the output of each light receiving element 3 and quenching resistor 41 into a short pulse wave; an adder circuit 43 that adds the short pulse wave output from each pulse shaping circuit 42; and a comparator circuit 44 that outputs a pulse in response to the output of the adder circuit 43 reaching a predetermined addition threshold. The number of single-photon avalanche diodes (SPADs) that constitute the silicon photomultiplier (SiPM) generally consists of about 130 to 6000 elements per pixel, and the number of quenching resistors 41 and pulse shaping circuits 42 corresponding to the number of respective elements, as well as the adder circuit 43, are integrated into an integrated circuit that constitutes the silicon photomultiplier (SiPM).

The time-of-flight measurement circuit 50 is configured with a time-to-digital converter (TDC) circuit that calculates, as a time of flight, the time from the rise of a light emission control signal output from the light emission control circuit 30 to the rise of an output signal from the comparator circuit 44 (specifically, from an emission time point of the measurement light to a time point when a sum (SiPM output) of the adder circuit reaches a predetermined addition threshold), that is, from an emission time point of the measurement light to a detection time point of the reflected light.

As shown in FIGS. 1 and 3, the histogram generation circuit 60 generates a histogram showing a frequency distribution of the times of flight, as calculated by the time-of-flight measurement circuit 50 for the measurement light repeatedly emitted at predetermined periods, over respective regions on the time axis that is divided into a plurality of regions at predetermined time intervals.

The representative value calculation circuit 70 calculates a representative value of the times of flight for an object based on the histogram, from the times for the regions where the frequency reaches a predetermined histogram threshold. The distance calculation circuit 80 calculates a distance to the object based on the representative value of the times of flight calculated by the representative value calculation circuit 70. The error correction circuit 90 calculates an error correction value based on a frequency-error characteristic and corrects the distance with the error correction value, where the frequency-error characteristic is determined by an error, the error being obtained from the frequency, as obtained by the histogram generation circuit 60 with intensity of the reflected light varied in advance, and difference between an actual distance and the above distance or difference between an actual time of flight and the above representative value of the times of flight.

The actual distance is the value of an actual physical distance from the optical rangefinder 200 to the object that reflects the reflected light, and the error is defined by difference from the value of the distance calculated by the distance calculation circuit 80. Likewise, the actual time of flight is the value of an actual time of flight of physical light, and the error may be defined by difference between the actual time of flight and the representative value of the times of flight calculated by the representative value calculation circuit 70. Based on the error characteristic obtained from these error values, an error correction value corresponding to the unit of distance or time can be calculated.

Reflected light for the pulsed measurement light emitted from the light emitting element 2 toward the object is detected by the plurality of photon-counting light receiving elements 3, and the voltage pulse output from each light receiving element 3 is added by the adder circuit 43. A time of flight from the emission time point of the measurement light to the time point when a sum calculated by the adder circuit 43 reaches the predetermined addition threshold is calculated by the time-of-flight measurement circuit 50.

Figure 4:
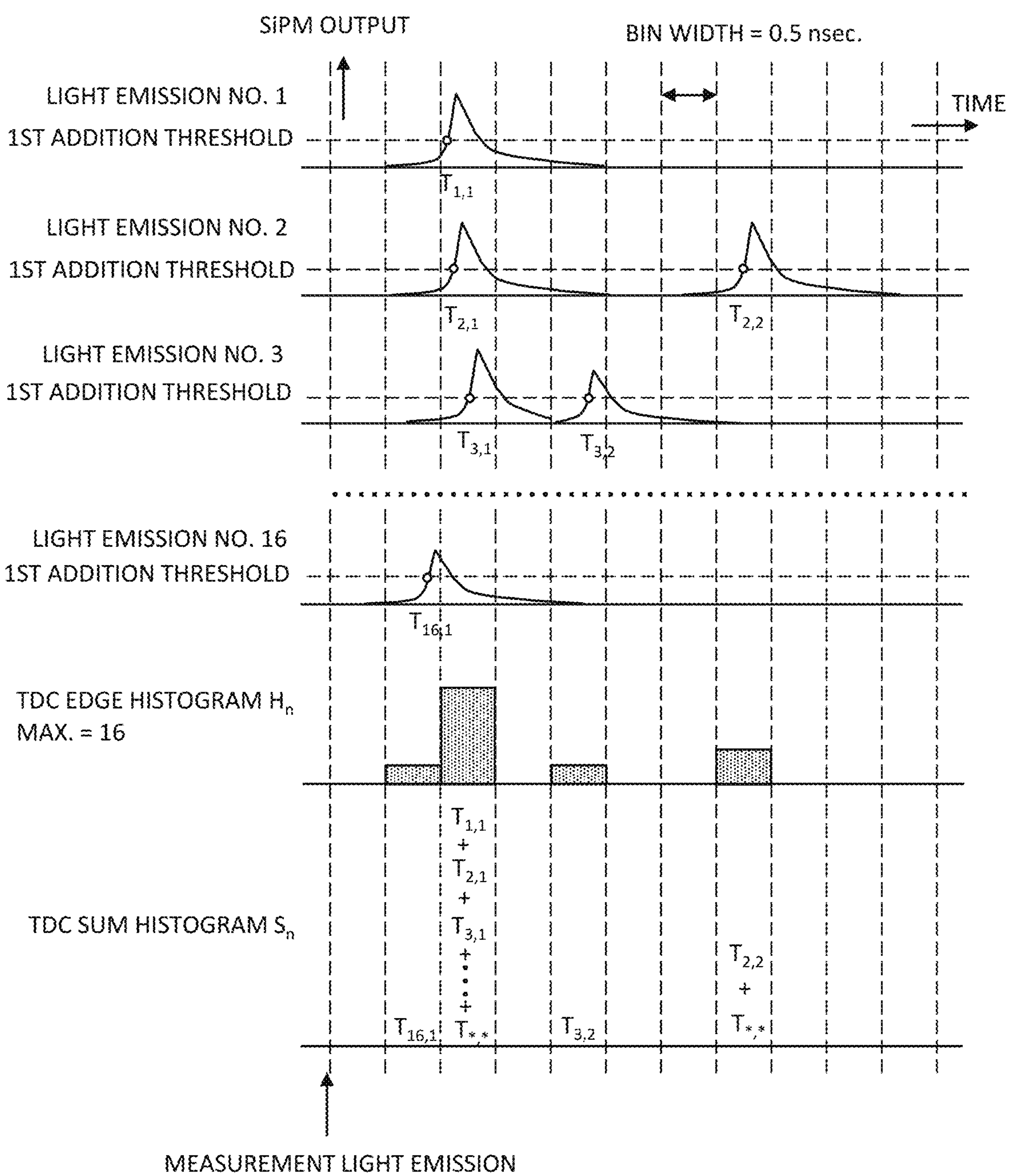
FIG. 4 illustrates operations of a histogram generation circuit and a representative value calculation circuit.

As shown in FIG. 4, the histogram generation circuit 60 generates a histogram showing a frequency distribution (the maximum frequency is 16) of the times of flight over respective regions on the time axis divided into a plurality of regions (in FIG. 4, each region is denoted as "bin") at predetermined intervals (0.5 nsec. in FIG. 4), based on each time of flight (in FIG. 4, denoted as "TDC count value $T_{m,n}$, where m is light emission No. and n is edge detection No.) calculated by the time-of-flight measurement circuit 50 for the measurement light repeatedly emitted (in the present embodiment, repeatedly emitted 16 times) at predetermined periods (about 500 kHz in the present embodiment) during the unit scanning angle (0.25° in this embodiment).

Specifically, the time of flight is defined as the time from the emission time point of the measurement light to the time point when the output from the adder circuit 43 (SiPM output) reaches the predetermined addition threshold. A TDC edge histogram, or the frequency $H_n$, is determined by adding the counts of the times of flight present in each region (bin), and a TDC SUM histogram, or the total time of flight Sn, is determined by adding the times of flight present in each region (bin).

The representative value calculation circuit 70 calculates a representative value of the times of flight ($S_n/H_n$) for the object from the times of flight distributed over the regions (bins) where the frequency $H_n$ reaches a predetermined histogram threshold, and the distance calculation circuit 80 calculates the distance to the object based on the representative value of the times of flight calculated by the representative value calculation circuit 70. Then, the error correction circuit 90 corrects the distance. As will be detailed below, the error correction circuit 90 preliminarily determines, as a known error, difference between the actual distance to the measurement target and the distance thereto based on the representative value of the times of flight determined from the measurement, for each frequency that is obtained by the histogram generation circuit 60 with the intensity of the reflection light varied in advance. Based on the thus obtained frequency-error characteristic, the error correction circuit 90 calculates the distance error correction value to correct the distance calculated by the distance calculation circuit 80.

As the representative value of the times of flight for the object, the representative value calculation circuit 70 calculates the total time of flight $S_n$, which is the total sum of the times of flight distributed over the regions where the frequency $H_n$ reaches the predetermined histogram threshold, divided by the value of the frequency $H_n$ based on the histogram. In the example of FIG. 4, the value obtained by dividing $S_n=T_{1,1}+T_{2,1}+T_{3,1}+ \ldots +T^{*.*}$ by the value of the frequency $H_n$ is the representative value.

In the example in FIG. 4, the representative value is calculated only using the regions (bins) where the frequency reaches the predetermined histogram threshold. However, the representative value calculation circuit 70 may calculate, as the representative value of the times of flight for the object, the total sum of the times of flight distributed over the regions (bin) where the frequency reaches the predetermined histogram threshold and a region (bin) adjacent thereto based on the histogram divided by the sum of respective frequencies for the corresponding regions (bins).

It is contemplated that the histogram frequencies may exist across the respective regions on the time axis divided into the multiple regions (bins). Even in such cases, however, a more accurate representative value can be obtained by calculating, as the representative value of the times of flight for the object, a total sum of the times of flight distributed over the regions (bins) where the frequency reaches the predetermined histogram threshold and any region (bin) adjacent thereto based on the histogram divided by a sum of respective frequencies for the corresponding regions (bins). In such cases, the region adjacent to the regions where the frequency reaches the predetermined histogram threshold may include either one of right and left regions, whichever has a larger frequency, adjacent to these regions with the largest frequency or may include both adjacent regions.

When a frequency in a single region does not reach the predetermined histogram threshold but a total sum of frequencies distributed over multiple regions reaches the histogram threshold, a total sum of the times of flight distributed over the multiple regions divided by a sum of respective frequencies for the corresponding regions may be calculated as the representative value of the times of flight. This leads to a more accurate representative value. The effect of chattering, in which the frequencies are distributed over adjacent bins in the histogram, can be reduced, yielding an accurate representative value.

Figure 5:
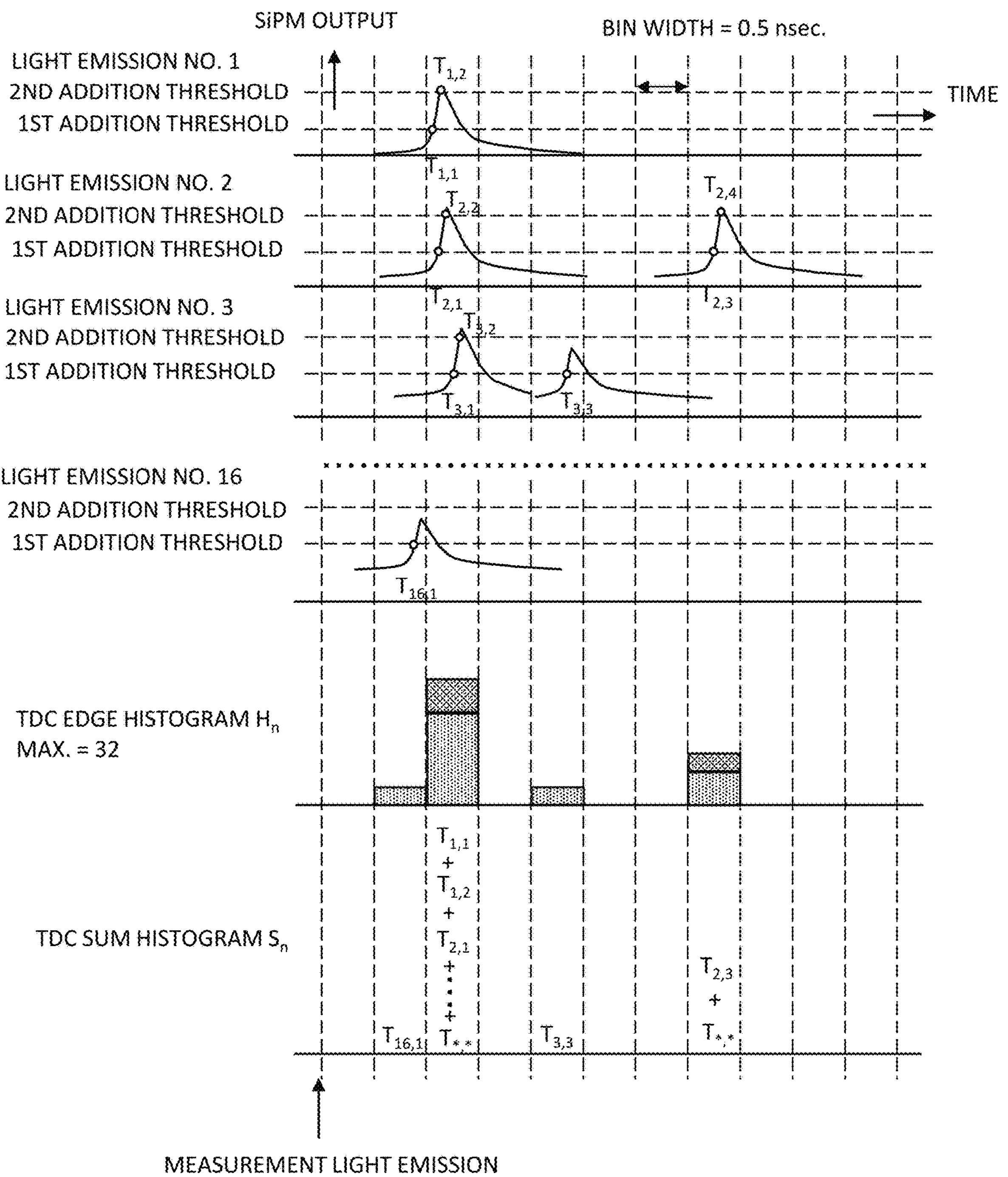
FIG. 5 illustrates operations of the histogram generation circuit and the representative value calculation circuit in accordance with another aspect.

Additionally, as shown in FIG. 5, the time-of-flight measurement circuit 50 may be configured to calculate, as times of flight, each of the times from the emission time point of the measurement light to the time point when the sum (SiPM output) of the adder circuit 43 reaches a predetermined addition threshold (first addition threshold) and to the time point when the sum reaches a higher addition threshold (second addition threshold) than the predetermined addition threshold.

In such cases, the histogram generator circuit 60 is configured to generate a histogram showing a frequency distribution of the respective times of flight, as calculated by the time-of-flight measurement circuit 50 for the measurement light repeatedly emitted at predetermined periods, over the respective regions on the time axis divided into multiple regions (bins) at predetermined intervals.

The representative value calculation circuit 70 may be configured to calculate, as the representative value of the times of flight for the object, a total sum of the respective times of flight corresponding to a predetermined addition threshold, out of the times of flight distributed over the regions (bins) where the frequency reaches a predetermined histogram threshold based on the histogram, divided by the frequency corresponding to the predetermined addition threshold.

Further, the error correction circuit 90 may be configured to calculate an error correction value based on the frequency-error characteristic and correct the distance or the representative value of the times of flight with the error correction value, where the frequency-error characteristic is determined by an error, the error being obtained from the frequency, as obtained from the histogram based on the first and second addition thresholds, and difference between an actual distance and the above distance. In such cases, the maximum value (Max.) of the edge detection number n denoted by "TDC count value $T_{m,n}$" is 32 as shown in FIG. 5, which provides an effect equivalent to expanding the dynamic range of the histogram, resulting in a more appropriate frequency-delay characteristic. The frequency-delay characteristic in such cases needs to be additionally obtained based on the frequencies corresponding to the two addition thresholds.

The error correction circuit 90 described above will be discussed.

As described with reference to FIG. 2, the outputs from the individual single-photon avalanche diodes (SPADs) are shaped into short pulse waves by the pulse shaping circuit 42 and added by the adder circuit 43, and upon the addition threshold being reached, a pulse signal is output from the comparator circuit 44 and the time of flight including delay time is calculated by the time-of-flight measurement circuit 50.

Figure 6A:
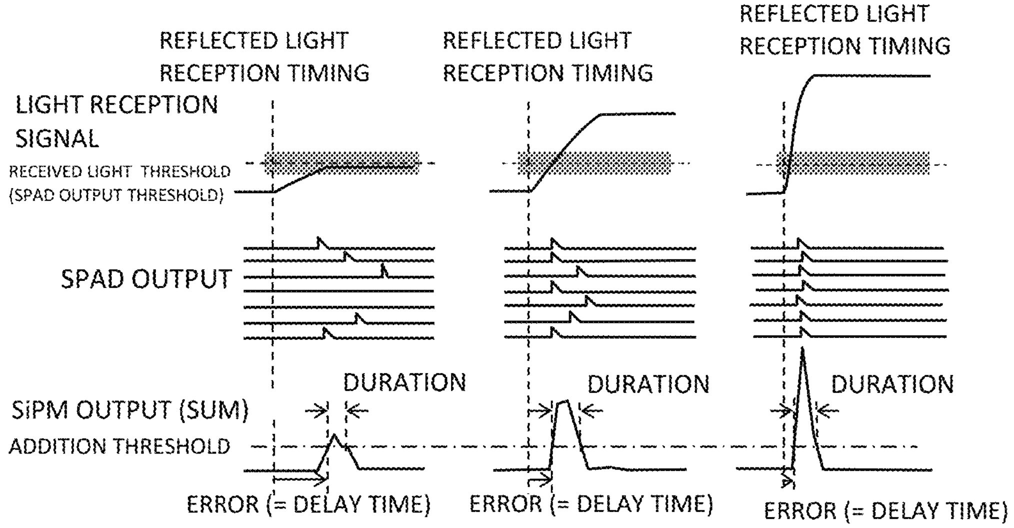
FIG. 6A illustrates waveforms of a light receiver.

In FIG. 6A, response characteristics of the silicon photomultiplier (SiPM), i.e., the light receiving element 3, and the individual single-photon avalanche diodes (SPADs) that constitute the silicon photomultiplier (SiPM) to the light reception signals are shown.

The upper graph in FIG. 6A shows relative relationship between the light reception signal of the individual single-photon avalanche diodes (SPADs) and a received light threshold (binarization threshold) of the pulse shaping circuits 42. While the received light threshold for the individual pulse shaping circuits 42, which are configured as an integrated circuit, is all set to the same value, the light detection by the single photon avalanche diodes (SPADs), in reality, responds with a certain probability, so that the received light threshold is schematically illustrated as a gray band with a certain width in the figure.

Accordingly, there is a certain degree of stochastic variations in the output timing of the individual single-photon avalanche diodes (SPADs) for each of a "small" received light intensity, which is at a similar level to the received light threshold due to the weak light reception signal, a "medium" received light intensity, which is somewhat greater than the received light threshold, and a "large" received light intensity, which is sufficiently greater than the received light threshold.

The middle graph in FIG. 6 shows output characteristics of some of the individual single-photon avalanche diodes (SPADs). With the "small" received light intensity, the output timing of the pulse-shaping circuits 42 varies, and some of the elements do not output any signal. With the "medium" received light intensity, all of the pulse shaping circuits 42 output signals, but the output timing varies. With the "large" received light intensity, all of the pulse shaping circuits 42 output signals at approximately the same time.

The lower graph in FIG. 6 shows relationship between the output from the silicon photomultiplier (SiPM), i.e., the output from the adder circuit 43, and the addition threshold. In response to the output from the adder circuit 43 reaching the addition threshold, the comparator circuit 44 outputs a pulse. However, due to variations in the rise characteristics of light reception signals and response time of the single-photon avalanche diodes (SPADs), an error (delay time) occurs between the arrival of the original light reception signal and the pulse rise time identified by the addition threshold. Accordingly, in order to identify the time of flight with higher accuracy, it is necessary to correct the delay time by subtracting the delay time from the time of flight/the representative value of the times of flight as determined by the time between the departure of the measurement light and the pulse rise time, or to correct the error, corresponding to the delay time, for the distance corresponding to the representative value of the times of flight.

The error (delay time) tends to be smaller in the order of the "small," "medium," and "large" received light intensities, and the frequency at which the output from the adder circuit 43 is equal to or greater than the addition threshold increases with an increase in the received light intensity when the received light intensity is small, and becomes almost 100% once the received light intensity exceeds a certain level. Also, the duration in which the output from the adder circuit 43 is equal to or greater than the addition threshold is short when the peak value of the output from the silicon photomultiplier (SiPM) corresponds to the "small" received light intensity near the addition threshold, and becomes longer as the output signal from the silicon photomultiplier (SiPM) increases with an increase in the received light intensity. The duration decreases when the output from the silicon photomultiplier (SiPM) rises in a short period of time due to the "large" received light intensity.

In other words, the histogram frequency of the times of flight generated by the histogram generation circuit 60 tends to be "small," "saturated," and "saturated" for the "small," "medium," and "large" received light intensities, respectively, and the duration in which the addition threshold is exceeded in that occasion tends to exhibit "small," "large," and "small" mountain shapes for the "small," "medium," and "large" received light intensities, respectively. Here, the duration is a sum (calculated by a pulse width adder circuit shown in FIG. 3) of the durations obtained for the regions where the predetermined histogram threshold is reached, as obtained by the histogram generation circuit 60, divided by the frequency. Saturation refers to satisfying the predetermined frequency, which is the maximum limit, or refers to such predetermined frequency being satisfied. The saturation of the histogram may be determined based on whether the frequency in the histogram is equal to or greater than a predetermined value.

The duration of an intensity-duration characteristic can be smoothed by dividing the sum of durations for the regions where the predetermined histogram threshold is reached, as obtained by the histogram generation circuit 60, by the sum of respective frequencies for these regions.

Figure 6B:
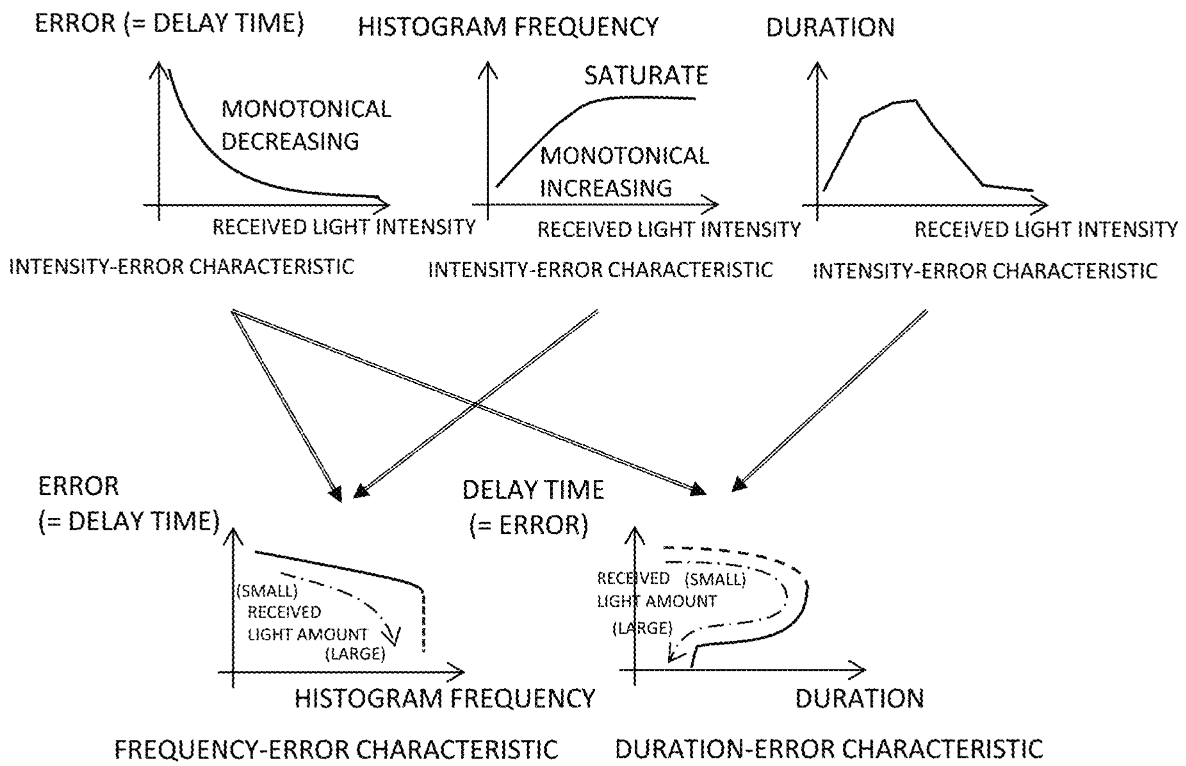
FIG. 6B illustrates characteristics of error, histogram frequency, and duration relative to the received light intensity.

Based on this tendency, an intensity-error characteristic, an intensity-frequency characteristic, and the intensity-duration characteristic shown in FIG. 6B are obtained. In other words, even for the reflected light from the same object, different received light intensities lead to different times of flight, which results in an error between the distance calculated by the distance calculation circuit 80 and the actual distance to the measurement target.

Hence, the frequency-error characteristic and a duration-error characteristic are derived based on the intensity-error characteristic, the intensity-frequency characteristic, and the intensity-duration characteristic, which are obtained using the histogram generation circuit 60 or the like with the reflected light intensity varied in advance, and these derived characteristics are stored as a correction table in the memory in the correction circuit 100. This allows the error correction circuit 90 to correct the distance based on the representative value of the times of flight using the error by referring to the correction table.

The error is determined as the difference between the actual distance to the actual measurement target and the distance thereto based on the representative value of the times of flight before correction. The delay time is determined as the difference between the theoretical time of flight determined from the distance to the actual measurement target and the representative value of the times of flight before correction measured by the actual measurement.

To vary the reflected light intensity, the emission intensity of the measurement light can be variably set, or various attenuation filters can be disposed in the light receiver of the light receiving element 3, or the reflection properties of the object to be irradiated with the measurement light can be varied. Example ways of varying the reflection properties of the object include using white paper, black paper, gray paper, metallic foil coated paper, retroreflective sheets, or the like.

The frequency-error characteristic is obtained by combining, based on the intensity, the intensity-frequency characteristic and the intensity-error characteristic for the measurement light repeatedly emitted at predetermined periods in advance, where the intensity-frequency characteristic exhibits its correlation between the reflected light intensity and the frequency obtained by the histogram generation circuit 60, and the intensity-error characteristic exhibits correlation between the reflected light intensity and the error (delay time).

Figure 7:
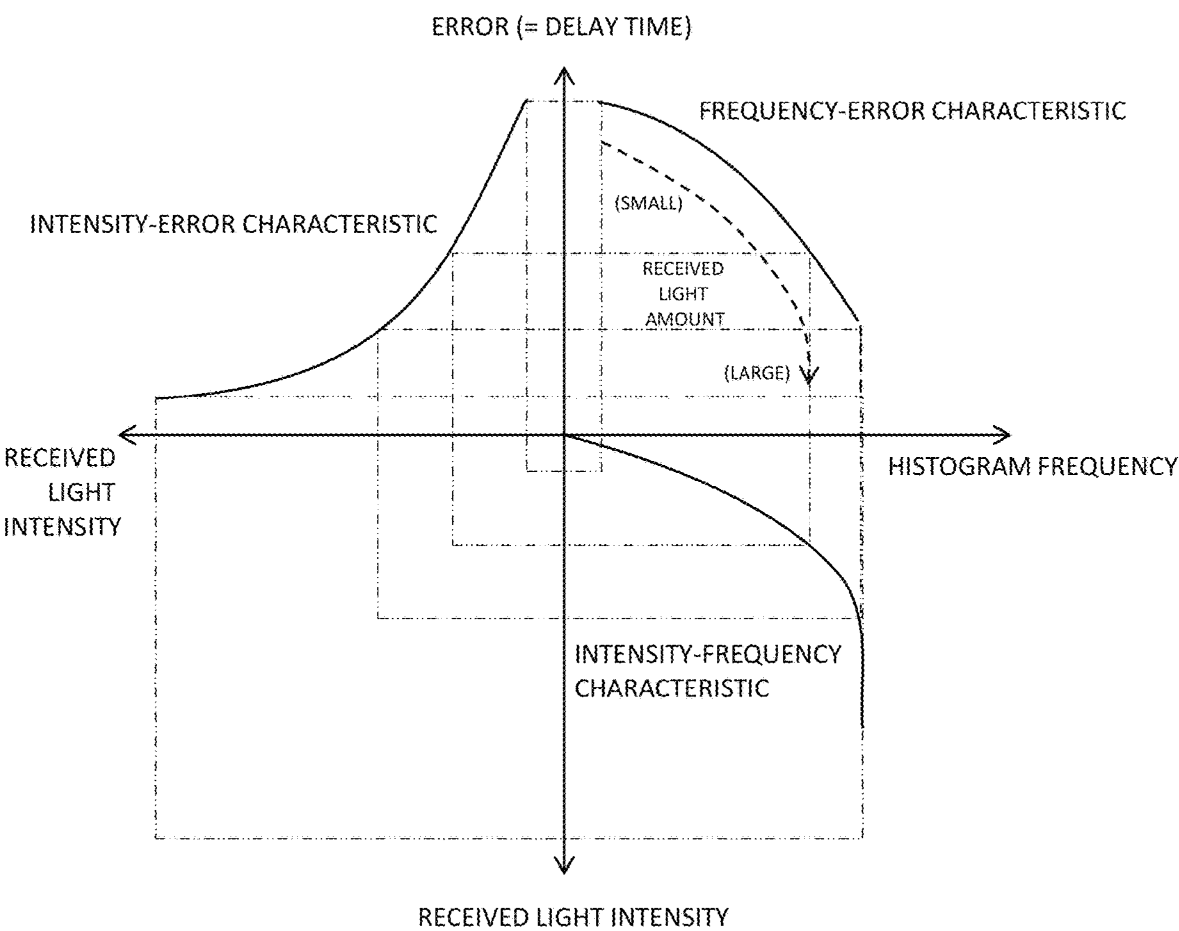
FIG. 7 illustrates a frequency-error characteristic.

FIG. 7 conceptually illustrates generation of the frequency-error characteristic. The frequency-error characteristic can be obtained by associating the frequency of the intensity-frequency characteristic with the error (delay time) of the intensity-error characteristic based on the intensity. The thus obtained frequency-error characteristic defines a histogram correction table shown in FIG. 3.

The frequency-error characteristic exhibits a monotonically decreasing characteristic in which the error (delay time) decreases as the frequency increases. The intensity-frequency characteristic exhibits a monotonically increasing characteristic in which the frequency increases as the reflected light intensity increases to a certain value. The intensity-error characteristic exhibits a monotonically decreasing characteristic in which the error (delay time) decreases as the reflected light intensity increases. Combining both characteristics based on the reflected light intensity can yield a monotonically decreasing characteristic in which the error decreases as the frequency increases.

As shown in FIGS. 6B and 7, the frequency-error characteristic exhibits a monotonically decreasing characteristic, and upon the amount of light received exceeding a certain value, the histogram frequency is saturated and thus can no longer be associated with the delay time, making further correction impossible.

To provide for such cases, the error correction circuit 90 corrects the representative value of the times of flight with the error correction value using the duration-error characteristic described above, after the frequency of the frequency-error characteristic has been saturated.

The duration-error characteristic is obtained by combining, based on the reflected light intensity, the intensity-error characteristic and the intensity-duration characteristic for the measurement light repeatedly emitted at predetermined periods in advance, where the intensity-error characteristic exhibits correlation between the reflected light intensity and the error (delay time), and the intensity-duration characteristic exhibits correlation between the reflected light intensity and the duration in which the sum (SiPM output) of the adder circuit is equal to or greater than the predetermined addition threshold.

The duration-error characteristic is obtained by determining, for the measurement light repeatedly emitted at predetermined periods and under different intensities of the reflected light, the intensity-error characteristic exhibiting correlation between the reflected light intensity and the error (delay time) and the intensity-duration characteristic exhibiting correlation between the reflected light intensity and the duration in which the sum of the adder circuit is equal to or greater than the predetermined addition threshold, and then combining both characteristics based on the intensity. Any region with a monotonically increasing characteristic in which the error (delay time) increases with an increase in the duration is used for the duration-error characteristic.

Figure 8:
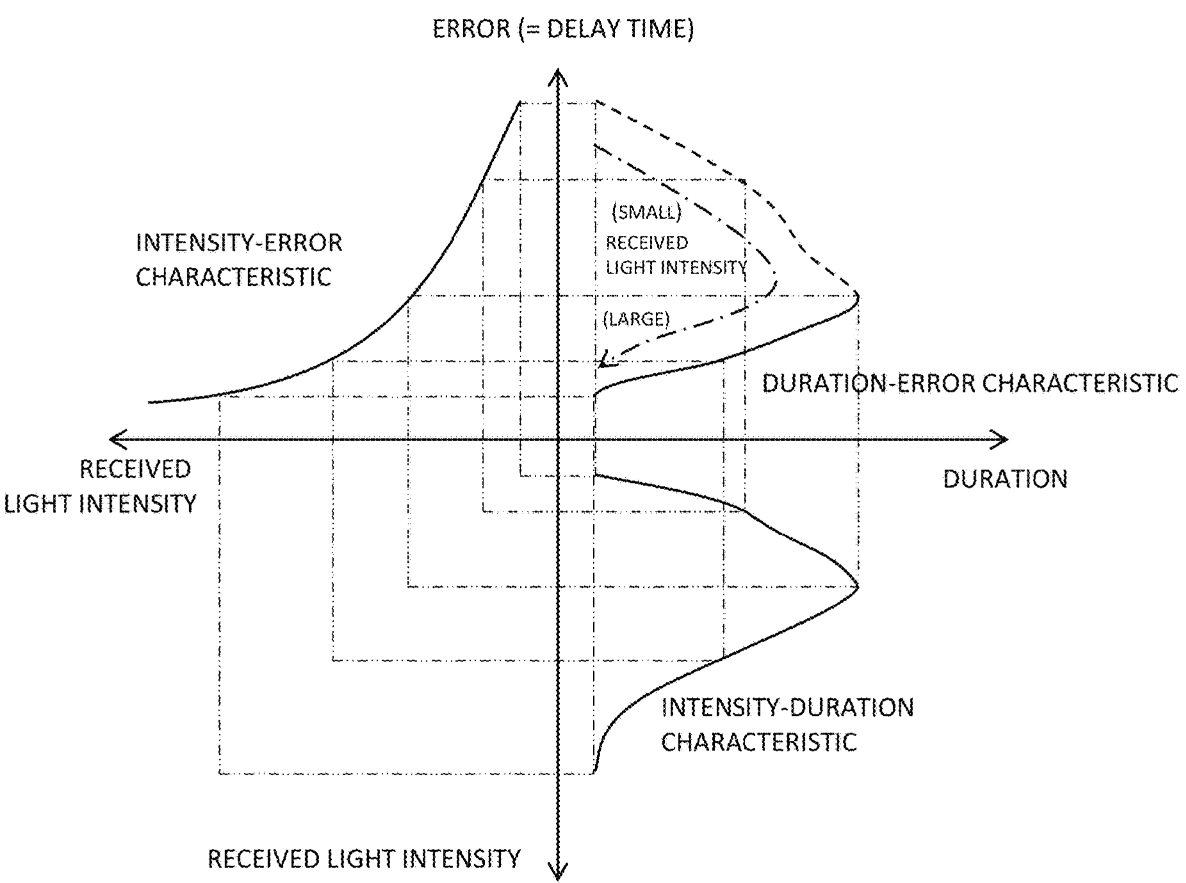
FIG. 8 illustrates a duration-error characteristic.

FIG. 8 conceptually illustrates generation of the duration-error characteristics. The duration-error characteristic can be obtained by associating the error (delay time) of the intensity-error characteristic with the duration of the intensity-duration characteristic based on the intensity. The thus obtained duration-error characteristic defines a pulse width table shown in FIG. 3.

The intensity-error characteristic exhibits a monotonically decreasing characteristic in which the error decreases as the reflected light intensity increases. The intensity-duration characteristic exhibits a mountain-shaped characteristic in which the duration gradually increases in the regions with low to medium reflected light intensities and gradually decreases in the regions with medium to high reflected light intensities, with the maximum duration occurring in the region with the medium reflected light intensity.

Combining both characteristics based on the reflected light intensity yields a monotonically decreasing characteristic in which the error (delay time) decreases with an increase in the duration in the regions with low to medium reflected light intensities, and yields a monotonically decreasing characteristic in which the error (delay time) decreases with a decrease in the duration in the regions with medium to high reflected light intensities. Since the received light intensity at which the duration is longest corresponds to the received light intensity at which the histogram frequency is saturated, upon the frequency being saturated in the frequency-error characteristic, the correction can then be made based on the duration-delay time characteristic.

In the above description and in FIG. 6, the error (=delay time), histogram frequency, and duration are combined/integrated based on the received light intensity. However, it is not necessary to combine/integrate these factors based on the received light intensity itself, and any index correlated with the received light intensity can be used instead. For example, when it is difficult to measure the received light intensity itself, the above factors may be combined based on any other index that is found to be correlated with the received light intensity. For example, under the same measurement conditions, the received light intensity is expected to increase with an increase in the measurement light intensity. By varying the measurement light intensity to measure the delay time, histogram frequency, and duration corresponding to each measurement light intensity, one can determine respective correlations, such as error (delay time)-histogram frequency and error (delay time)-duration correlations. Thus, any calculated distance can be appropriately corrected without needing to determine the background light amount, while avoiding an increase in circuit scale despite the use of the photon-counting light receiving elements.

Figure 9:
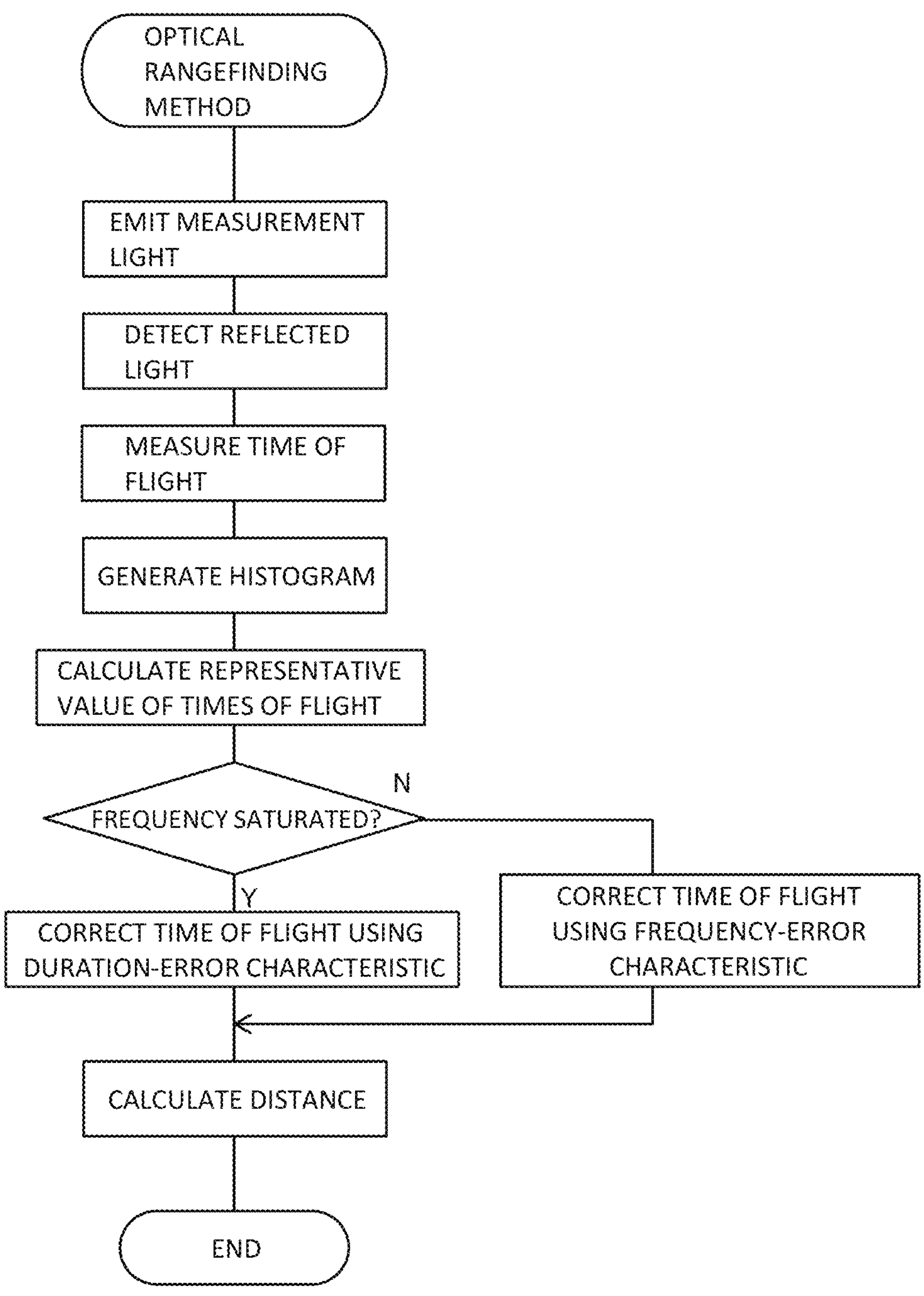
FIG. 9 is a flowchart of a procedure of a TOF optical rangefinding method.

As shown in FIG. 9 and as described above, the optical rangefinding method in accordance with the present invention is a TOF rangefinding method including: a reflected light detection step of detecting, using a plurality of photon-counting light receiving elements, reflected light from an object for pulsed measurement light emitted from a light emitting element; a time of flight measurement step of calculating a time of flight from an emission time point of the measurement light to a time point when an sum of voltage pulses output from each of the light receiving elements reaches a predetermined addition threshold; a histogram generation step of generating a histogram showing a frequency distribution of the times of flight, as calculated in the time of flight calculation step for repeated emission of measurement light at predetermined periods, over respective regions on a time axis divided into a plurality of regions at predetermined time intervals; a representative value calculation step of calculating a representative value of the times of flight for the object from times of flight that are distributed over regions where the frequency reaches a predetermined histogram threshold based on the histogram; and a distance calculation step of calculating a distance to the object based on the representative value of the times of flight calculated in the representative value calculation step, where the distance calculation step further includes an error correction step of correcting the distance with an error correction value.

The error correction step corrects the distance with the error correction value based on the frequency-error characteristic, which is determined by an error, the error being obtained from the frequency, as obtained in the histogram generation step with the reflected light intensity varied in advance, and the difference between an actual distance and the distance. Once the frequency of the frequency-error characteristic is saturated, the representative value of the times of flight is corrected with the error correction value based on the duration-error characteristic, where the duration is a period of time in which the sum is equal to or greater than the addition threshold with the reflected light intensity varied in advance. The determination of whether the frequency has been saturated may be made based on whether the histogram frequency is equal to or greater than a predetermined value.

In the above embodiment, the representative value of times of flight for the object is calculated, a distance to the object is calculated based on the representative value of the times of flight, and this distance is corrected with the error correction value. However, the representative value of the times of flight may be corrected with delay time, which is equivalent to the error, and the distance may be calculated from the corrected representative value of the times of flight.

The foregoing embodiment is merely an example of the present invention, and the descriptions of the embodiment do not limit the scope of the present invention.

REFERENCE SIGNS LIST

1 Light emitting element
3 Light receiving element
10 Optical scanning device
20 Motor drive circuit
30 Light emission control circuit
40 Light receiving circuit
50 Time-of-flight measurement circuit
60 Histogram generation circuit
70 Representative value calculation circuit
80 Distance calculation circuit
90 Error correction circuit
100 Control circuit
200 Optical rangefinder

The invention claimed is:

1. An optical rangefinder comprising:

a light emitting element configured to emit pulsed measurement light;

a plurality of photon-counting light receiving elements configured to detect reflected light from an object for the measurement light;

an adder circuit configured to add a voltage pulse output from each of the light receiving elements;

a time-of-flight measurement circuit configured to calculate, as a time of flight, time from an emission time point of the measurement light to a time point when a sum of the adder circuit reaches a predetermined addition threshold;

a histogram generation circuit configured to generate a histogram showing a frequency distribution of the times of flight, as calculated by the time-of-flight measurement circuit for repeated emission of the measurement light at predetermined periods, over respective regions on a time axis divided into a plurality of regions at predetermined time intervals;

a representative value calculation circuit configured to calculate a representative value of the times of flight for the object from the times of flight that are distributed over the regions where the frequency reaches a predetermined histogram threshold based on the histogram; and a distance calculation circuit configured to calculate a distance to the object based on the representative value of the times of flight calculated by the representative value calculation circuit, wherein the distance calculation circuit includes an error correction circuit configured to calculate an error correction value based on a frequency-error characteristic and correct the distance or the representative value of the times of flight with the error correction value, the frequency-error characteristic being determined by an error, the error being obtained from the frequency, as obtained by the histogram generation circuit with intensity of the reflected light varied in advance, and difference between an actual distance and the distance or between an actual time of flight and the representative value of the times of flight, the error correction circuit is configured to calculate the error correction value based on a duration-error characteristic and correct the distance or the representative value of the times of flight with the error correction value after the frequency of the frequency-error characteristic is saturated, the duration being a period of time in which the sum of the adder circuit is equal to or greater than the addition threshold, with the intensity of the reflected light varied in advance, and the duration-error characteristic being determined by an error obtained from a difference between the actual distance and the distance, or a difference between the actual time of flight and the representative value of the times of flight.

2. The optical rangefinder according to claim 1, wherein the frequency-error characteristic is specified based on an intensity-frequency characteristic and an intensity-error characteristic for the measurement light repeatedly emitted at predetermined periods in advance, the intensity-frequency characteristic exhibiting correlation between an index of the intensity of the reflected light and the frequency obtained by the histogram generation circuit, the intensity-error characteristic exhibiting correlation between the index of the intensity of the reflected light and the error.

3. The optical rangefinder according to claim 2, wherein the frequency-error characteristic exhibits a monotonically decreasing characteristic in which the error decreases with an increase in the frequency.

4. The optical rangefinder according to claim 1, wherein the duration-error characteristic is a characteristic specified based on an intensity-error characteristic and an intensity-duration characteristic for the measurement light repeatedly emitted at predetermined periods in advance, the intensity-error characteristic exhibiting correlation between an index of the intensity of the reflected light and the error, the intensity-duration characteristic exhibiting correlation between the index of the intensity of the reflected light and the duration in which the sum of the adder circuit is equal to or greater than the addition threshold.

5. The optical rangefinder according to claim 4, wherein the duration is a sum of the durations obtained by the histogram generation circuit for the regions where the predetermined histogram threshold is reached divided by a sum of respective frequencies for the regions.

6. The optical rangefinder according to claim 1, wherein the duration-error characteristic exhibits a monotonically increasing characteristic in which the error increases with an increase in the duration.

7. The optical rangefinder according to claim 1, wherein the representative value calculation circuit is configured to calculate, as the representative value of the times of flight for the object, a value that is a total sum of the times of flight distributed over the regions where the frequency reaches the histogram threshold based on the histogram divided by a sum of respective frequencies for the regions.

8. The optical rangefinder according to claim 1, wherein the representative value calculation circuit is configured to calculate, as the representative value of the times of flight for the object, a value that is a total sum of times of flight distributed over regions where the frequency reaches the histogram threshold and a region adjacent thereto based on the histogram divided by a sum of respective frequencies for corresponding regions.

9. The optical rangefinder according to claim 1, wherein the representative value calculation circuit is configured to calculate, as the representative value of the times of flight for the object, a value that is a total sum of the times of flight distributed over a plurality of adjacent regions divided by a sum of respective frequencies for corresponding regions, the plurality of adjacent regions being regions where a total sum of the frequencies distributed over the plurality of adjacent regions reaches the histogram threshold based on the histogram.

10. The optical rangefinder according to claim 1, wherein the time-of-flight measurement circuit is configured to calculate, as the time of flight, a time of flight from the emission time point of the measurement light to each of time points when an output value of the adder circuit reaches a first addition threshold and reaches a second addition threshold higher than the first addition threshold, the histogram generation circuit is configured to generate a histogram showing a frequency distribution of the times of flight, as calculated by the time-of-flight measurement circuit for repeated emission of the measurement light at predetermined periods, over respective regions on a time axis divided into a plurality of regions at predetermined time intervals, the representative value calculation circuit is configured to calculate, as the representative value of the times of flight for the object, a total sum of the times of flight corresponding to the first addition threshold, among the times of flight distributed over the regions where the frequency reaches the histogram threshold based on the histogram based on the first addition threshold, divided by the frequency corresponding to the first addition threshold, and the error correction circuit is configured to calculate the error correction value based on a frequency-error characteristic and correct the distance or the representative value of the times of flight with the error correction value, the frequency-error characteristic being determined by an error, the error being obtained from the frequency, as obtained in the histogram based on the first addition threshold and the second addition threshold, and difference between an actual distance and the distance.

11. The optical rangefinder according to claim 1, further comprising an optical deflection device configured to deflect the measurement light emitted from the light emitting element in a predetermined direction and/or an optical scanning device configured to scan with the measurement light in a predetermined direction.

12. An optical rangefinding method comprising:

a reflected light detection step of detecting, using a plurality of photon-counting light receiving elements, reflected light from an object for pulsed measurement light emitted from a light emitting element;

a time of flight measurement step of calculating, as a time of flight, time between an emission time point of the measurement light and a time point when a sum of voltage pulses output from each of the light receiving elements reaches a predetermined addition threshold;

a histogram generation step of generating a histogram showing a frequency distribution of the times of flight, as calculated in the time of flight measurement step for repeated emission of the measurement light at predetermined periods, over respective regions on a time axis divided into a plurality of regions at predetermined time intervals;

a representative value calculation step of calculating a representative value of the times of flight for the object from the times of flight that are distributed over the regions where the frequency reaches a predetermined histogram threshold based on the histogram; and a distance calculation step of calculating a distance to the object based on the representative value of the times of flight calculated in the representative value calculation step, wherein the distance calculation step includes an error correction step of calculating an error correction value based on a frequency-error characteristic and correcting the distance or the representative value of the times of flight with the error correction value, the frequency-error characteristic being determined by an error, the error being obtained from the frequency, as obtained in the histogram generation step with intensity of the reflected light varied in advance, and difference between an actual distance and the distance or difference between an actual time of flight and the representative value of the times of flight, wherein the error correction step calculates the error correction value based on a duration-error characteristic and corrects the distance or the representative value of the times of flight with the error correction value after the frequency of the frequency-error characteristic is saturated, the duration being a period of time in which the sum is equal to or greater than the predetermined addition threshold with intensity of the reflected light varied in advance, and the duration-error characteristic being determined by an error obtained from a difference between the actual distance and the distance, or a difference between the actual time of flight and the representative value of the times of flight.

* * * * *